(12) United States Patent
Duchesne et al.

(10) Patent No.: US 6,610,807 B2
(45) Date of Patent: Aug. 26, 2003

(54) FLUOROPOLYMERS WITH IMPROVED CHARACTERISTICS

(75) Inventors: Denis Duchesne, Woodbury, MN (US); Harald Kaspar, Burgkirchen (DE); Lisa P. Chen, St. Paul, MN (US); Klaus Hintzer, Woodbury, MN (US); Attila Molnar, Vadnais Heights, MN (US); Ludwig Mayer, Burgkirchen (DE); Gernot Löhr, Burgkirchen (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/190,096

(22) Filed: Jul. 3, 2002

(65) Prior Publication Data

US 2003/0026995 A1 Feb. 6, 2003

Related U.S. Application Data

(62) Division of application No. 09/604,178, filed on Jun. 27, 2000, now Pat. No. 6,489,420.

(51) Int. Cl.$^7$ ............... C08F 214/22; C08F 214/26; C08F 214/28; C08F 214/18
(52) U.S. Cl. ............... 526/250; 428/421; 428/422; 526/255; 526/247
(58) Field of Search ............... 526/255, 250, 526/247; 428/421, 422

(56) References Cited

U.S. PATENT DOCUMENTS

| | | |
|---|---|---|
| 3,876,654 A | 4/1975 | Pattison |
| 4,035,565 A | 7/1977 | Apotheker et al. |
| 4,233,421 A | 11/1980 | Worm |
| 4,259,463 A | 3/1981 | Moggi et al. |
| 4,335,238 A | 6/1982 | Moore et al. |
| 4,696,989 A | 9/1987 | Oka et al. |
| 4,882,390 A | 11/1989 | Grootaert et al. |
| 4,912,171 A | 3/1990 | Grootaert et al. |
| 4,972,038 A | 11/1990 | Logothetis |
| 5,151,492 A | 9/1992 | Abe et al. |
| 5,260,392 A | 11/1993 | Arcella et al. |
| 5,260,393 A | 11/1993 | Arcella et al. |
| 5,262,490 A | 11/1993 | Kolb et al. |
| 5,384,374 A | 1/1995 | Guerra et al. |
| 5,549,948 A | 8/1996 | Blong et al. |
| 5,656,121 A | 8/1997 | Fukushi |
| 5,658,670 A | 8/1997 | Fukushi et al. |
| 5,804,670 A | 9/1998 | Stoeppelmann |
| 5,855,977 A | 1/1999 | Fukushi et al. |
| 5,994,487 A | 11/1999 | Enokida et al. |
| 6,218,472 B1 | 4/2001 | Debras et al. |
| 6,242,548 B1 | 6/2001 | Duchesne et al. |

FOREIGN PATENT DOCUMENTS

| | | |
|---|---|---|
| CA | 2147045 | 10/1995 |
| EP | 0 002 809 A1 | 7/1979 |
| EP | 0 407 937 A1 | 1/1991 |
| EP | 0 525 687 A1 | 2/1993 |
| EP | 0 824 059 A1 | 2/1998 |
| JP | 40614525 A | 5/1994 |
| WO | WO 98/08679 | 3/1998 |
| WO | WO 99/00249 | 1/1999 |
| WO | WO 99/00454 | 1/1999 |

OTHER PUBLICATIONS

*Modern Fluoropolymers*, Wiley Series in Polymer Science, "THV Fluoroplastic", 1997, p. 257.

Primary Examiner—Fred Zitomer
(74) Attorney, Agent, or Firm—Dean M. Harts; James V. Lilly

(57) ABSTRACT

A fluoropolymer composition is provided. The polymer comprises interpolymerized units derived from (i) tetrafluoroethylene, (ii) vinylidene fluoride, (iii) at least one ethylenically unsaturated monomer of the formula $CF_2{=}CFR_f$ where $R_f$ is a perfluoroalkyl or a perfluoroalkoxy of 1 to 8 carbon atoms, and (iv) a perfluorovinyl ether of the formula $CF_2{=}CF{-}(OCF_2CF(R_f))_aOR_f$ where $R_f$ is as described in (iii), $R_f$ is a perfluoroaliphatic, preferably a perfluoroalkyl or a perfluoroalkoxy, of 1 to 8, preferably 1 to 3, carbon atoms, and a has a value of 0 to 3.

22 Claims, No Drawings

FLUOROPOLYMERS WITH IMPROVED CHARACTERISTICS

This application is a divisional application of U.S. Ser. No. 09/604,178 now U.S. Pat. No. 6,489,420, filed Jun. 27, 2000, the entirety of which is herein incorporated by reference.

FIELD OF THE INVENTION

The invention pertains to fluoropolymers derived from (i) tetrafluoroethylene (TFE), (ii) vinylidene fluoride (VF2), (iii) at least one ethylenically unsaturated monomer of the formula $CF_2=CFR_f$, and (iv) a perfluorovinyl ether of the formula $CF_2=CFOCF_2CF(R_f)_aOR'_f$ where a, $R_f$, and $R'_f$ are defined below.

BACKGROUND

Polymers of tetrafluoroethylene (TFE) with other fluorinated monomers such as vinylidene fluoride (VDF) and hexafluoropropylene (HFP) are known. These polymers include both fluoroelastomers and melt processable fluoroplastics.

Fluoroelastomers with high fluorine content have been shown to have excellent permeation resistance to fuels. (U.S. Pat. No. 4,696,989). However, high-fluorine elastomer systems based on tetrafluoroethylene (TFE), vinylidene fluoride (VDF) and hexafluoropropylene (HFP) have some limitations. When the TFE-content is too high, flexibility, and the ease of processing tend to be compromised. If the HFP content, at the expense of VDF is too high, the polymerization rate is much too low.

Another class of polymers with superior permeation properties are the melt-processable fluoroplastics THV (see Modern Fluoropolymers, Wiley, 1997). The terpolymers can have melting points up to 275° C. and show excellent permeation and low temperature properties. However, sealability and flexural properties sometimes do not meet industry requirements. The increased stiffness of those materials can lead to wrinkling when hoses are loaded onto forming mandrels. It can also lead to increased push-on force during hose installation and sealing concerns at connecting points. These fluoroplastic materials and their wide range of uses is described in more detail in "Modern Fluoropolymers", Wiley, 1997, p. 257. They typically are derived from monomer compositions comprising from 30–75 weight % TFE, 5–40 weight % HFP and 5–55 weight % VDF and have a melting point range of 100° C. to 275° C.

Because of their permeation resistance, fluoropolymers are desired in a variety of products, including hose and fuel-line designs for automotive applications such as those disclosed in U.S. Pat. No. 5,804,670 and EP 824059. Other product applications where such polymers are useful include fuel filler neck hoses, fuel vent lines, vapor return lines, chemical handling hoses and the like.

These product applications are often multilayer constructions in which the fluoropolymer layer serves as a chemically resistant or vapor impermeable barrier. The remainder of these multilayer constructions typically comprises a layer of either a less expensive non-fluorinated polymer layer or another fluoropolymer. These other polymers can be thermoplastic or they can be elastomeric in nature. The constructions can also employ a tie layer between the various layers. In any event, the layers are generally covalently bonded to each other.

These constructions generally must be highly flexible to facilitate installation, provide good sealing around connectors and to withstand the formation of bubbles and/or ripples in pieces with sharp bends. Additionally, when they are used with a non-fluorinated elastomer, the fluoropolymer must be resistant to high temperatures to minimize the temperatures encountered during the manufacture and use of constructions that employ them.

While the use of fluoropolymers in applications such as those disclosed above has increased in recent years, a need still exists to provide improved fluoropolymers. The present invention provides such improved fluoropolymers.

SUMMARY OF THE INVENTION

The present invention provides fluoropolymers that comprise TFE, VF2, at least one perfluorinated ethylenically unsaturated monomer, and a perfluorovinyl ether. The polymers of the invention demonstrate excellent physical properties over a broad range of compositions. They also demonstrate superior flexibility.

In accordance with the present invention there is provided a fluoropolymer derived from interpolymerized units of (i) TFE, (ii) VF2, (iii) at least one ethylenically unsaturated monomer of the formula $CF_2=CFR_f$ where $R_f$ is perfluoroalkyl of 1 to 8, preferably 1 to 3, carbon atoms, and (iv) a perfluorovinyl ether of the formula $CF_2=CF-(OCF_2CF(R_f))_aOR'_f$ where $R_f$ is a perfluoroalkyl of 1 to 8, preferably 1 to 3, carbon atoms, $R'_f$ is a perfluoroaliphatic, preferably perfluoroalkyl or perfluoroalkoxy, of 1 to 8, preferably 1–3, carbon atoms, and a has a value of from 0 to 3.

Also provided herein are multilayer articles comprising a first layer or strata of the polymer of the invention and a second layer or strata of the same or another polymer. The layers are preferably covalently bonded to one another either through a tie layer between them or by means of direct covalent bonding between the two layers. Other polymeric layers may also be employed in this embodiment of the invention.

Also provided in accordance with the present invention is an electrostatically dissipative (ESD) composition comprising an electrically conductive particulate material and the polymer of the invention.

Also provided herein is a method for improving the flexibility of a fluoropolymer containing interpolymerized units derived from TFE, VF2 and at least one ethylenically unsaturated monomer of the formula $CF_2=CFR_f$ where $R_f$ is as described above. The method comprises the steps of providing these monomers and a monomer of the formula $CF_2=CFOCF_2CF(R_f)_aOR'_f$ and polymerizing the monomers.

The polymer of the invention offers advantages, in the production of multi-layer articles by means of extrusion or coextrusion; in injection molding; and in compression molding. Fluoroplastics of the invention offer benefits in optical applications such as polymer optical fibers; and in use as an electrostatically dissipative (ESD) fluoroplastic. These advantages are especially useful in the case of complicated shapes.

Specific examples of such multilayer and/or shaped articles include fuel management components, e.g., fuel filler neck hoses, vent lines, vapor return lines, etc., where resistance to hydrocarbon fluids is important; chemical handling components (e.g., hoses containers, etc.) and polymer optical fibers. In this latter case the polymers of the invention can be used as the optical fiber itself or as a cladding around the optical fiber (typically an acrylate polymer).

DETAILED DESCRIPTION

The polymer of the invention is sometimes referred to herein as a quad polymer. In one preferred embodiment it is derived from 30 to 85 weight % TFE, 5 to 55 weight % VDF, and from 5 to 50 weight % of the unsaturated monomer having the formula $CF_2=CFR_f$ and from 0.1 to 15 weight % of the vinyl ether. Included in this range of compositions are semi-crystalline and elastomeric fluoropolymers.

The molecular weight of the polymer of the invention is not critical and may vary over a wide range. Thus it may vary from low molecular weight to ultra high molecular weight. Furthermore, the fluoropolymers may have either a generally unimodal or a multimodal molecular weight distribution.

The molecular weight of a semicrystalline fluoropolymer according to the invention may be described by its melt flow index (MFI). MFI can be determined by following the procedures described in either ISO 12086 or ASTM D-1238 at a support weight of 5 kg and a temperature of 265° C.

The molecular weight of an elastomeric fluoropolymer according to the invention may be described by its Mooney viscosity (ML). This value can be measured according to ASTM D 1646 using a one minute pre-heat and a 10 minute test at 121° C.

The semi-crystalline fluoropolymers of the invention typically have a peak melting temperature in the range of 100° to 275° C. (preferably 120 to 250° C.) and a number average molecular weight of from 25,000 to 1,000,000. Preferably they have a hydrogen content of less than 5% by weight and a fluorine content of from 65 to 76%. Most preferably the polymers of the invention consist essentially of interpolymerized units derived from the four enumerated monomers.

The elastomeric fluoropolymers of the invention typically exhibit a glass transition temperature ($T_g$) and a melting point of less than 120° C. The elastomers are essentially amorphous and are curable using known techniques. By essentially amorphous it is meant that the polymer may contain some crystallinity e.g., less than 10%. For example, they can be cured using onium cure chemistries such as are disclosed in U.S. Pat. Nos. 4,233,421; 4,882,390; and 5,262,490. Alternatively, they can be modified to include small amounts of cure-site monomers (e.g., bromine or iodine cure-site monomers or nitrile cure-site monomers) to render them peroxide curable. Such chemistries are disclosed in U.S. Pat. Nos. 4,035,565; 4,972,038; and 5,151,492.

Preferably, the thermoplastic polymers of the invention comprise interpolymerized units derived from (i) 40 to 80 weight percent (more preferably 45 to 76 weight percent) tetrafluoroethylene, (ii) 10 to 30 weight percent (more preferably 12 to 25 weight percent) vinylidene fluoride, (iii) 5 to 40 weight percent (more preferably from 10 to 30 weight percent) of a comonomer of the formula $CF_2=CFR_f$, and (iv) 0.1 to 15 weight percent (more preferably 1 to 10 weight percent) of the perfluorovinyl ether of the formula $CF_2=CF-(OCF_2CF(R_f))_aOR'_f$.

Preferably the elastomeric polymers of the invention comprise interpolymerized units derived from (i) 20 to 50 weight percent (more preferably 30 to 46 weight percent; most preferably 33 to 46 weight percent) TFE, (ii) 10 to 35 weight percent (more preferably 15 to 30 weight percent; most preferably 17 to 28 weight percent) VDF, (iii) 20 to 50 weight percent (more preferably from 25 to 45 weight percent; most preferably from 26 to 42 weight percent) of a comonomer of the formula $CF_2=CFR_f$, and from 0.1 to 15 weight percent (more preferably from 0.5 to 10 weight percent; most preferably from 0.5 to 7 weight percent) of the perfluorovinyl ether of the formula $CF_2=CF-(OCF_2CF(R_f))_aOR'_f$.

A preferred subclass of the perfluorovinyl ether has the formula $$CF_2=CF-(OCF_2CF(CF_3))_aOR'_f.$$

Examples of the perfluorovinyl ether having this formula include

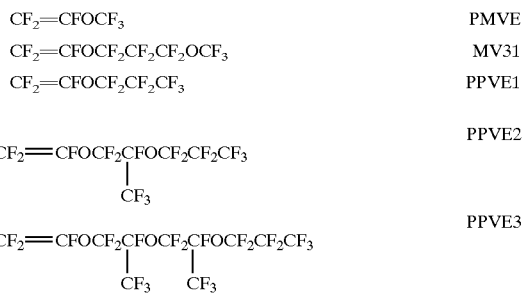

| | |
|---|---|
| $CF_2=CFOCF_3$ | PMVE |
| $CF_2=CFOCF_2CF_2CF_2OCF_3$ | MV31 |
| $CF_2=CFOCF_2CF_2CF_3$ | PPVE1 |
| $CF_2=CFOCF_2CFOCF_2CF_2CF_3$ <br>                 \| <br>                 $CF_3$ | PPVE2 |
| $CF_2=CFOCF_2CFOCF_2CFOCF_2CF_2CF_3$ with two $CF_3$ branches | PPVE3 |

Particularly preferred perfluorovinyl ethers are PPVE1 and PPVE2.

A preferred species of the quadpolymer of the invention contains interpolymerized units derived from TFE, VDF, HFP and the perfluorovinyl ether wherein the value of "a" is 0, 1 or 2.

Fluoropolymers of this class can be prepared by methods known in the fluoropolymer art. Such methods include, for example, free-radical polymerization of the monomers. In general, the desired olefinic monomers can be copolymerized in an aqueous colloidal dispersion in the presence of water-soluble initiators which produce free radicals such as ammonium or alkali metal persulfates or alkali metal permanganates, and in the presence of emulsifiers such as the ammonium or alkali metal salts of perfluorooctanoic acid. See for example U.S. Pat. No. 4,335,238 or Canadian Pat. No. 2,147,045. They may also be prepared using a fluorinated sulfinate as a reducing agent and a water soluble oxidizing agent capable of converting the sulfinate to a sulfonyl radical. Preferred oxidizing agents are sodium, potassium, and ammonium persulfates, perphosphates, perborates, and percarbonates. Particularly preferred oxidizing agents are sodium, potassium, and ammonium persulfates.

Aqueous emulsion and suspension polymerizations can be carried out in conventional steady-state conditions in which, for example, monomers, water, surfactants, buffers and catalysts are fed continuously to a stirred reactor under optimum pressure and temperature conditions while the resulting emulsion or suspension is removed continuously. An alternative technique is batch or semibatch polymerization by feeding the ingredients into a stirred reactor and allowing them to react at a set temperature for a specified length of time or by charging ingredients into the reactor and feeding the monomer into the reactor to maintain a constant pressure until a desired amount of polymer is formed.

As previously disclosed herein, the quadpolymer may be an ESD fluoropolymer composition. In this aspect of the invention, the ESD quadpolymer composition comprises a major amount of the quadpolymer, up to 20% by weight of a conductive material, and a minor amount, up to 5% of another melt processable thermoplastic material, preferably a hydrocarbon polymer. The ESD quadpolymer composition preferably contains 2 to 10 wt % of the conductive material and 0.1 to 3 wt % of the hydrocarbon polymer. While a wide variety of conductive fillers are useful, the most commonly employed conductive materials are carbon black, graphite and fibers thereof. Likewise, a variety of hydrocarbon polymers may be used as the other melt processable thermoplastic material. Such materials are preferably fluid at the processing temperature of the quadpolymer. Additionally, the hydrocarbon polymer is preferably immiscible with the quadpolymer. Preferably, the hydrocarbon polymers are olefin polymers of the type disclosed in U.S. Pat. No. 5,549,948, col. 2, line 52 to col. 4, line 60 incorporated herein by reference.

The fluoropolymer of this invention, can be easily co-processed (for example coextruded) with a variety of thermoplastic and elastomeric polymers in the fabrication of multi-layer articles such as hoses, tubes, films, sheets, wire coatings, cable jackets, containers, pipes, etc. Examples of polymers that can be co-processed with the polymer of the invention include thermoplastic and elastomeric polymers. Examples of such polymers are polyamides, polyimides, polyurethanes, polyolefins, polystyrenes, polyesters, polycarbonates, polyketones, polyureas, polyacrylates, polymethacrylates, epichlorohydrin-containing elastomers, nitrile-butadiene elastomers, ethylene propylene diene elastomers, silicone-containing elastomers, fluoroelastomers, etc. Preferably the elastomers are curable by techniques known in the art, e.g., by peroxide curing, hydroxyl curing, polyamine curing, sulfur curing, etc. The particular polymer selected will depend upon the application or desired properties.

Polyamides that can be co-processed with the fluoropolymer and fluoropolymer compositions of the invention are generally commercially available. For example, polyamides such as any of the well-known nylons are available from a number of sources. Particularly preferred polyamides are nylon-6, nylon-6,6, nylon-11, nylon-12, and nylon 6-636. It should be noted that the selection of a particular polyamides material should be based upon the physical requirements of the particular application for the resulting article. For example, nylon-6 and nylon-6,6 offer higher heat resistance properties than nylon-11 or nylon-12, whereas nylon-11 and nylon-12 offer better chemical resistant properties. In addition to those polyamide materials, other nylon materials such as nylon-6,12, nylon-6,9, nylon-4, nylon-4,2, nylon-4,6, nylon-7, and nylon-8 may also be used. Ring containing polyamides, e.g., nylon-6,T and nylon-6,1, may also be used. Polyether containing polyamides, such as PEBAX polyamides (Atochem North America, Philadelphia, Pa.), may also be used.

Useful co-processable polyurethane polymers include aliphatic, cycloaliphatic, aromatic, and polycyclic polyurethanes. These polyurethanes are typically produced by reaction of a polyfunctional isocyanate with a polyol according to well-known reaction mechanisms. Useful diisocyanates for employment in the production of a polyurethane include dicyclohexylmethane-4,4'-diisocyanate, isophorone diisocyanate, 1,6-hexamethylene diisocyanate, cyclohexyl diisocyanate, and diphenylmethane diisocyanate. Combinations of one or more polyfunctional isocyanates may also be used. Useful polyols include polypentyleneadipate glycol, polytetramethylene ether glycol, polyethylene glycol, poly-caprolactone diol, poly-1,2-butylene oxide glycol, and combinations thereof. Chain extenders, such as butanediol or hexanediol, may also optionally be used in the reaction. Commercially available urethane polymer useful in the present invention include: PN-3429 from Morton International, Seabrook, N.H., and X-4107 from B. F. Goodrich Company, Cleveland, Ohio.

The polyolefin polymers that can be co-processed are generally homopolymers or copolymers of ethylene, propylene, acrylic monomers, or other ethylenically unsaturated monomers, for example, vinyl acetate and higher alpha-olefins. Such polymers and copolymers can be prepared by conventional free-radical polymerization or catalysts of such ethylenically unsaturated monomers. The degree of crystallinity of the olefin polymer or copolymer can vary. The polymer may, for example, be a semi-crystalline high density polyethylene or may be an elastomeric copolymer of ethylene and propylene. Carboxyl, anhydride, or imide functionalities may be incorporated into the hydrocarbon polymer within the present invention, by polymerizing or copolymerizing functional monomers, for example, acrylic acid or maleic anhydride, or by modifying a polymer after polymerization, for example, by grafting, by oxidation or by forming ionomers. These include, for example, acid modified ethylene vinyl acetates, acid modified ehtylene acrylates, anhydride modified ethylene acrylates, anhydride modified ethylene vinyl acetates, anhydride modified polyethylenes, and anhydride modified polypropylenes. The carboxyl, anhydride, or imide functional polymers useful as the hydrocarbon polymer are generally commercially available. For example, anhydride modified polyethylenes are commercially available from DuPont, Wilmington, Del., under the trade designation BYNEL coextrudable adhesive resins.

Polyacrylates and polymethacrylates useful that can be co-processed include, for example, polymers of acrylic acid, methyl acrylate, ethyl acrylate, acrylamide, methylacrylic acid, methyl methacrylate, and ethyl acrylate, to name a few. As mentioned above, other useful substantially non-fluorinated co-processable polymers include polyesters, polycarbonates, polyketones, and polyureas. These materials are generally commercially available, for example, SELAR polyester (DuPont, Wilmington, Del.), LEXAN polycarbonate (General Electric, Pittsfield, Mass.), KADEL polyketone (Amoco, Chicago, Ill.), and SPECTRIM polyurea (Dow Chemical, Midland, Mich.).

Examples of co-processable elastomeric polymers include acrylonitrile butadiene (NBR), butadiene rubber, chlorinated and chloro-sulfonated polyethylene, chloroprene, EPM, EPDM, epichlorohydrin (ECO), isobutylene isoprene, isoprene, polysulfide, polyurethane, silicone, PVC-NBR, styrene butadiene, and vinyl acetate ethylene. Examples of these compounds include Nipol 1052 NBR (Zeon, Louisville, Ky.), Hydrin 2000 ECO (Zeon, Louisville, Ky.), Hypalon 48 (Dupont, Wilmington, Del.), and Nordel 2760P EPDM (Dupont, Wilmington, Del.).

The co-processing of fluoropolymers is further described in U.S. Pat. Nos. 5,656,121, 5,658,670, 5,855,977, WO 98/08679, WO 99/00249, and WO 99/00454, which discloses composite articles employing a fluorine-containing polymer. The fluoropolymers and ESD polymers of the present invention may be used as the fluorine-containing polymer in such composite articles. Such articles include two, three and more than three layer composite articles. The articles may employ a tie layer to join the fluoropolymer to the other layers.

The elastomeric fluoropolymers may also be compounded with various other ingredients to modify their properties and/or usefulness. For example, they can be combined with curatives to provide composition that, upon curing, exhibits good physical properties.

Useful curatives include both peroxides or polyol/onium salt combinations. Useful peroxides include dialkyl peroxides, with di-tertiary butyl peroxides being particularly preferred. Specific examples include 2,5-dimethyl-2,5-di (tertiarybutylperoxy)-hexyne-3 and 2,5-dimethyl-2,5-di (tertiarybutylperoxy)-hexane. Additional examples of useful peroxides include dicumyl peroxide, dibenzoyl peroxide, tertiarybutyl perbenzoate, and di[1,3-dimethyl-3-(tertiarybutylperoxy)-butyl]carbonate.

One or more crosslinking co-agents may be combined with the peroxide. Examples include triallyl cyanurate; triallyl isocyanurate; tri(methallyl)-isocyanurate; tris (diallylamine)-s-triazine, triallyl phosphite; N,N-diallyl acrylamide; hexaallyl phosphoramide; N,N,N'N'-tetraallyl terephthalamide; N,N,N',N'-teraallyl malonamide; trivinyl isocyanurate; 2,4,6-trivinyl methyltrisiloxane; and tri(5-norbornene-2-methylene) cyanurate.

Suitable onium salts are described, for example, in U.S. Pat. Nos. 4,233,421; 4,912,171; and 5,262,490, each of which is incorporated by reference. Examples include triphenylbenzyl phosphonium chloride, tributyl alkyl phosphonium chloride, tributyl benzyl ammonium chloride, tetrabutyl ammonium bromide, and triarylsulfonium chloride.

Another class of useful onium salts is represented by the following formula:

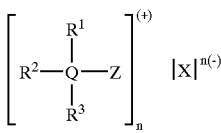

where Q is nitrogen or phosphorus;

Z is a hydrogen atom or is a substituted or unsubstituted, cyclic or acyclic alkyl group having from 4 to about 20 carbon atoms that is terminated with a group of the formula —COOA where A is a hydrogen atom or is a $NH_4^+$ cation or Z is a group of the formula $CY_2$—COOR' where Y is a hydrogen or halogen atom, or is a substituted or unsubstituted alkyl or aryl group having from 1 to about 6 carbon atoms that may optionally contain one or more catenary heteroatoms and where R' is a hydrogen atom, a $NH_4^+$ cation, an alkyl group, or is an acyclic anhydride, e.g., a group of the formula —COR where R is an alkyl group or is a group that itself contains organo-onium (i.e., giving a bis-organo-onium); preferably R' is hydrogen; Z may also be a substituted or unsubstituted, cyclic or acyclic alkyl group having from 4 to about 20 carbon atoms that is terminated with a group of the formula —COOA where A is a hydrogen atom or is a $NH_4^+$ cation;

$R_1$, $R_2$, and $R_3$ are each, independently, a hydrogen atom or an alkyl, aryl, alkenyl, or any combination thereof; each $R_1$, $R_2$, and $R_3$ can be substituted with chlorine, fluorine, bromine, cyano, —OR", or —COOR" where R" is a $C_1$ to $C_{20}$ alkyl, aryl, aralkyl, or alkenyl, and any pair of the $R_1$, $R_2$, and $R_3$ groups can be connected with each other and with Q to form a heterocyclic ring; one or more of the $R_1$, $R_2$, and $R_3$ groups may also be a group of the formula Z where Z is as defined above;

X is an organic or inorganic anion (e.g., halide, sulfate, acetate, phosphate, phosphonate, hydroxide, alkoxide, phenoxide, or bisphenoxide); and n is a number equal to the valence of the anion X.

Suitable polyols for use with the onium salt include polyhydroxy aromatic compounds such as 2,2-bis(4-hydroxyphenyl)propane [bisphenol A], 2,2-bis(4-hydroxyphenyl)perfluoropropane [bisphenol AF], hydroquinone, catechol, resorcinol, 4,4'-dihydroxydiphenyl, 4,4'-dihydroxydiphenylmethane, 4,4'-dihydroxydiphenylsulfone, and 2,2-bis(4-hydroxydiphenylbutane), their alkali metal salts, alkaline earth metal salts, and combinations thereof. Other useful polyols are described, e.g., in U.S. Pat. Nos. 4,259,463; 3,876,654; 4,912,171; 4,233,421; and 5,384,374, each of which is incorporated by reference.

The curable fluoroelastomer composition can also include fillers to improve the physical properties of both the curable and the cured composition. Examples of suitable fillers include reinforcing agents (e.g., thermal grade carbon blacks or non-black pigments), silica, graphite, clay, talc, diatomaceous earth, barium sulfate, titanium oxide, wollastonite, and combinations thereof. Other ingredients that may be added to the composition, alone or in combination with one or more fillers, include, for example, plasticizers, lubricants, retarding agents, processing aids, pigments, and combinations thereof.

The present invention is further illustrated in the following representative examples. The methods used to determine various physical properties of the polymers is first described.

EXAMPLES

Measurement Methodology

The measurement of the MFI value for the polymer was carried out in accordance with ISO 12086 or ASTM D-1238 at a support weight of 5 kg and a temperature of 265° C. The MFIs cited here were obtained with a standardized extrusion die of 2.1 mm diameter and a length of 8 mm.

The melting peaks of the polymers were determined by means of a Perkin-Elmer $DSC_{7.0}$ under a nitrogen flow and a heating rate of 10° C./min. The indicated melting points relate to the melting peak maximum. (ASTM 4591, ISO 12086).

The crystallization temperature ($T_c$) of each polymer was determined by means of a Perkin-Elmer DSC 7.0 under a nitrogen flow and a cooling rate of 20° C./min. The indicated crystallization points relate to the crystallization peak maximum (ASTM 4591, 1SO 12086).

Mooney Viscosity (ML) was measured according to: ASTM D 1646 using a 1 minute pre-heat and a 10 minute test at 121° C.

Press Cure Conditions for samples with curatives, unless otherwise noted, were the following: 76×152×2 mm sheets were prepared for physical property testing by pressing at 5 to 7 MPa at 177° C. for 10 minutes.

Hardness was measured according to: ASTM D 2240 Method A. Shore A durometer was used.

Tensile Strength at Break was measured according to ASTM D638 for uncured samples. All values are for the transverse direction unless otherwise noted. For cured samples, Tensile Strength at Break ($T_B$) and Elongation at Break ($E_B$) were measured according to ASTM D 412 using Die D at 25° C.

Clarity was measured by determining the refractive index of the polymer using a Prism Coupler Refractive Index measurement system.

Flex life was measured according to MIT 2176.

Flexural modulus was measured according to ASTM D 790 Method 1. For uncured samples, 127×12.7×2 mm rectangular bars were cut from compression molded plaques and tested at room temperature using a 101.6 mm support span and a 50.8 mm/min crosshead speed. For cured samples, 32×6.23 mm rectangular bars were die cut from press-cured plaques and tested at room temperature using a 28 mm support span and 0.01 $min^{-1}$ strain rate.

Vapor Transmission was measured according to: ASTM D 814. The test fluid used was a mixture of 42.5% toluene, 42.5% isooctane, and 15% methanol by volume. Sheets of 0.75–0.90 mm thickness of each composition were press-cured. 3 inch diameter samples were die cut from each sheet. Vapor transmission cups, each with a 2.5 inch diameter opening (4.909 $in^2$ exposed sample surface) and approximately 160 cc capacity, were used and are available from Thwing-Albert Instrument Co. High fluorine, low durometer fluoroelastomer gaskets insured a good seal between the sample and the test fluid. The cups were assembled by placing 100 cc of fluid in the cup, a 0.5 mm gasket between the cup and sample, and a 1.5 mm gasket between the sample and clamping ring. Because the samples were extensible during testing, a 16-mesh circular screen was placed between the upper gasket and clamping ring. All tests were conducted at 40° C. for 32 days with the cup maintained in the upright position. The cups were weighed approximately every other day. The first 7 days of testing allowed for sample equilibration time, so data collected during this time was not used to calculate the vapor transmission rate. The rate is then multiplied by the thickness of the sample in millimeters to normalize each value. Two samples per compound were tested and averaged.

In the following examples, a series of fluoropolymers were modified with perfluorovinyl ether. In some cases they were compared with fluoropolymers that were not modified with perfluorovinyl ether.

Example 1

A polymerization vessel with a total volume of 180 L equipped with a impeller agitator system is charged with 115

L deionized water, 8 g oxalic acid, 50 g ammonium oxalate and 280 g perfluorooctanoate ammonium salt (PFOA). The vessel is then heated up to 60° C. The following materials were charged: ethane to a pressure of 0.85 bar absolute (partial pressure of 0.55 bar), PPVE-1 to 2.35 bar absolute (1235 g), hexafluoropropene (HFP) to 10.3 bar absolute (4200 g), vinylidenedifluoride (VDF) to 11.8 bar absolute (345 g), and tetrafluoroethylene (TFE) to 15.5 bar absolute (1595 g) reaction pressure. The polymerization is initiated by 50 ml of a 2.6% aqueous potassium permanganate solution. As the reaction starts, the reaction pressure of 15.5 bar absolute is maintained by the feeding TFE, HFP and VDF and PPVE-1 into the gas phase with a feeding ratio HFP (kg)/TFE (kg) of 0.283 and a VDF (kg)/TFE (kg) of 0.419 and PPVE-1 (kg)/TFE(kg) of 0.45. Within the polymerization the 2.6% aqueous potassium permanganate solution is continuously charged into the vessel with a feeding rate 110 mL/h.

After feeding 33.5 kg TFE, the monomer feed is interrupted and the monomer valves are closed. The addition of potassium permanganate solution is maintained at a feed rate of 40 ml/h. Within 15 min, the monomer gas phase is reacted down to a vessel pressure of 10.7 bar; then the reactor is vented.

The resulting polymer dispersion has a solid content of 34% and is coagulated, washed and dried yielding 57 kg of polymer. The polymer shows a melting point maximum of 159° C. and an MFI(265/5) of 15 g/10 min.

Example 2

In this example, quad polymers 1, 2, and 3 are compared to commercially available polymer from Dyneon LLC as THV 500 G (C-1). Table 1 lists the monomer compositions that were used to prepare the quad compositions 1, 2 and 3 and the commercially available terpolymer C-1.

TABLE 1

| Polymer | Monomer Charge (Wgt %) | | | |
|---|---|---|---|---|
| | VDF | HFP | TFE | PPVE 1 |
| C-1 | 22 | 19 | 59 | — |
| 1 | 21.4 | 18.5 | 57.2 | 2.7 |
| 2 | 20.7 | 17.8 | 55.4 | 6.1 |
| 3 | 20.1 | 17.3 | 53.8 | 8.8 |

Table 2 lists the physical properties of the polymers. The incorporation of 1 wt % to 10 wt % PPVE-1 has little impact on the melt point of compositions 1, 2 and 3 as compared to that for C-1. Yet, quad polymers 1, 2, and 3 are extremely flexible as compared to that of C-1. The flex-life of these materials is also significantly improved. In addition, the tensile strength of quad polymers 1, 2, and 3 is increased by 8 to 20%. Quad polymers 1, 2, and 3 are more transparent in the U.V. region as compared with that of C-1 and have significantly lower refractive indexes.

TABLE 2

| Polymer | Melt Point (C.) | Flexural Modulus (MPa) | Flex-life Transverse (Cycles) | Tensile Strength at break (MPa) | Transmission at 220/350 nm (%) | Refractive index | % F | MFI 265° C./5 kg |
|---|---|---|---|---|---|---|---|---|
| C-1 | 164 | 247 | 73500 | 29.8 | 24.6/65.5 | 1.3560 | 72.3 | 13 |
| 1 | 159 | 130 | 105200 | 36.9 | 31.6/81.0 | 1.3543 | 72.3 | 15 |
| 2 | 159 | 70 | 324200 | 32.1 | 57.6/86.1 | 1.3507 | 72.3 | 16 |
| 3 | 156 | 48 | 554100 | 34.6 | 46.8/74.2 | 1.3496 | 72.3 | 19 |

Example 3

Quad polymer 4 is compared to the commercially available terpolymer C-1. Quad polymer 4 was derived from a polymer composition of 21.7 wgt. % VDF, 18.7 wgt. % HFP, 58.1 wgt. % of TFE and 1.6 wgt. % of PPVE 2. Table 3 lists the physical properties of the polymers. The incorporation of 1.5 wgt % of PPVE 2 has no impact on the melt point of composition 4 as compared to that of C-1. In this case, the quad polymer is more flexible and exhibit improved flex-life characteristics as compared to that for C-1. The tensile strength of the quad polymer is also greater than that for C-1. The U.V./visible region transparency and as well as the refractive index of the quad polymer 4 are also better than that for C-1.

TABLE 3

| Polymer | Melt Point (C.) | Flexural Modulus (MPa) | Flex-life Transverse (Cycles) | Tensile Strength at break (MPa) | Transmission at 220/350 nm (%) | Refractive index | % F | MFI 255° C./5 kg |
|---|---|---|---|---|---|---|---|---|
| C-1 | 164 | 247 | 73500 | 29.8 | 24.6/65.5 | 1.3560 | 72.3 | 13 |
| 4 | 167 | 121 | 125800 | 34.0 | 49.8/86 | 1.3532 | 72.3 | 13 |

Example 4

Quad polymer 5 is compared to a commercially available low melting terpolymer from Dyneon LLC as THV 200 (C-2). The two polymers have similar melting points. Quad polymer 5 and terpolymer C-2 were derived from the following polymer compositions:

TABLE 4

| Polymer | Monomer Charge (Wgt. %) | | | |
|---|---|---|---|---|
| | VDF | HFP | TFE | PPVE 1 |
| C-2 | 35.7 | 18.5 | 45.8 | — |
| 5 | 23.1 | 25.3 | 47.6 | 4 |

Table 5 lists the physical properties of the polymers. The quad polymer 5 also shows improved mechanical and optical properties when those are compared to those for C-2.

TABLE 5

| Polymer | Melt Trans. Point (C.) | Flexural Modulus (MPa) | Flex-life (Cycles) | Tensile Strength at break (MPa) | Transmission at 220/350 nm (%) | Refractive index | % F | MFI 265° C./5 kg |
|---|---|---|---|---|---|---|---|---|
| C-2 | 120 | 80[a] | 200000 | 29[c] | 29.4/48.6 | 1.3630 | 70.1 | 20 |
| 5 | 128 | 32[b] | | 41.6[c] | 74.5/89.8 | 1.3502 | 72 | 22 |

[a]4 inch span
[b]2 inch span
[c]Longitudinal direction

Example 5

In this example, the properties of a high melting quad polymer were compared to a terpolymer (C-3) with a similar melt point. The two polymers were derived from the following monomer compositions:

TABLE 6

| Polymer | Monomer Charge (Wgt. %) | | | |
|---|---|---|---|---|
| | VDF | HFP | TFE | PPVE 1 |
| C-3 | 17.5 | 15 | 67.5 | — |
| 6 | 16.4 | 14.1 | 63.5 | 6 |

Table 7 lists the physical properties of the polymers.

TABLE 7

| Polymer | Melt Point (C.) | Flexural Modulus (MPa) | Flex-life (Cycles) | Tensile Strength at break (MPa) | Transmission at 220/350 nm (%) | Refractive index | % F | MFI 265° C./5 kg |
|---|---|---|---|---|---|---|---|---|
| C-3 | 205 | 500 | 71,200 | 30.2[a] | 28.3/61.4 | 1.3520 | 73.1 | 10 |
| 6 | 193 | 205 | 233,800 | 36.4[a] | 44.9/82.1 | 1.3491 | 73 | 25 |

[a]Longitudinal direction

Again, the quad polymer exhibits superior mechanical and optical properties when compared to those of a terpolymer with similar melt point.

Example 6

In this example, a multimodal terpolymer (C-4) is compared to two multimodal quad polymers of similar melt point. The polymers were derived from the following monomer compositions:

TABLE 8

| Polymer | Monomer Charge (Wgt. %) | | | |
|---|---|---|---|---|
| | VDF | HFP | TFE | PPVE 1 |
| C-4 | 13 | 10.9 | 76.1 | — |
| 7 | 12.8 | 10.8 | 75.4 | 1 |
| 8 | 12.7 | 10.7 | 74.6 | 2 |

Table 9 lists the physical properties of the polymers.

TABLE 9

| Polymer | Melt Point (C.) | Flex-life Transverse (Cycles) | Tensile Strength at Break (MPa) | % F | MFI 265° C./5 kg |
|---|---|---|---|---|---|
| C-4 | 236 | 3400 | 15.4[a] | 73.4 | 23 |
| 7 | 230 | 18400 | 22.7[a] | 73.8 | 20 |
| 8 | 228 | 27400 | 24.9[a] | 73.8 | 24 |

[a]Longitudinal direction

The quad polymers (7 and 8) exhibit much improved flex-life when compared to that of terpolymer (C-4) with similar melt point. In this case, the impact of introducing a small amount of vinyl ether in the composition provides a dramatic improvement in flex-life characteristics.

Example 7

In this example, the effect of adding a perfluoroalkylvinylether to a fluoroplastic derived from TFE, HFP and VDF and subsequently compounding the material as an electrostatic dissipative (ESD) material is demonstrated. The polymers used were floropolymers C-1 and 2. The polyolefin used was Escorene 5252.09 from Exxon. The carbon black used was Vulcan XC-72 from Cabot. The flex-life and tensile strength of each composition were tested and are reported in Table 10.

TABLE 10

| Polymer | Carbon Black (Wt %) | Polyolefin-based Processing Aid (WT %) | Melt Point (C.) | Flex-Life (Cycles) | Tensile Strength at break (MPa) |
| --- | --- | --- | --- | --- | --- |
| C-1 | 9.5 | 0.5 | 165 | 600 | 15 |
| 2 | 9 | 2 | 170 | 42500 | 36.7 |

The quad polymer ESD composition of the invention exhibits significantly better mechanical properties than those for a terpolymer ESD composition of equivalent melt point. This improvement is a great advantage as ESD compounds are required in automotive fuel line applications.

Example 8

In this example the ESD compositions were based on quad polymer of Example 6 and a terpolymer of Example C-4.

The polyolefin processing aid used was Escorene 5252.09 from Exxon. The carbon black used was Vulcan XC-72 from Cabot.

The flex-life and tensile strength were measured and are reported in Table 11.

TABLE 11

| Polymer | Carbon Black (Wt %) | Polyolefin-based Processing Aid (WT %) | Melt Point (C.) | Flex-Life (Cycles) | Tensile Strength at break (MPa) |
| --- | --- | --- | --- | --- | --- |
| C-4 | 9 | 2 | 200 | 600 | 19.5 |
| 6 | 9 | 2 | 193 | 22500 | 29.5 |

Again, mechanical properties are improved with the inclusion of perfluorovinyl ether.

Example 9

This example demonstrates the impact of incorporating a small amount of perfluoroalkylvinylether on the mechanical properties of a high melting point multimodal terpolymer derived from TFE, HFP and VDF. The carbon black used was Vulcan XC-72 from Cabot. The processing aid used was Escorene 5252.09 from Exxon.

Table 12 lists the physical characteristics of the polymers.

TABLE 12

| Polymer | Carbon Black (Wt %) | Polyolefin-based Processing Aid (WT %) | Melt Point (C.) | Flex-Life (Cycles) | Tensile Strength at break (MPa) |
| --- | --- | --- | --- | --- | --- |
| C-4 | 9.5 | 2 | 236 | 550 | 16.9 |
| C-5 | 9.5 | 2 | 230 | 650 | 18.7 |
| 7 | 9.5 | 2 | 231 | 1200 | 24.9 |

The carbon black and polyolefin processing aid were the same as used in Example 7. The flexlife and tensile strength were measured and are reported. Polymer C-5 was derived from 12 wgt. % VDF, 18 wgt. % HFP and 70 wgt. % TFE.

It is clear from this data that the Polymer 6 (a multimodal polymer) has improved flex-life and tensile strength.

Examples 10–12

A polymerization vessel with a volume of 180 L, equipped with a impeller agitator, was charged with 110 L of deionized water, 5 g oxalic acid, 40 g ammonium oxalate and 250 g perfluorooctanoate ammonium salt. The oxygen free vessel was heated up to 60° C.; ethane was charged to a pressure of 1.3 bar, 360 g PPVE-2 was charged, and HFP to 11.9 bar pressure, VDF to 13.1 bar pressure and TFE to 15.5 bar absolute pressure. The polymerization was initiated by adding 50 mL of a 2.4% w $KMnO_4$ solution. As the polymerization starts, the reaction pressure of 15.5 bar pressure was kept constant by feeding TFE, HFP and VDF with a feeding ratio HFP(kg)/TFE(kg) of 0.91 and VDF(kg)/TFE(kg) of 0.63. During the polymerization $KMnO_4$ solution was continuously added at a rate of 120 mL/h. Additional 350 g vaporized PPVE-2 was fed during the polymerization. After feeding 19.6 kg TFE, the monomer feedings were stopped and the polymerization was discontinued. The resulting latex showed particles with 120 mm average particle size diameter. The latex was coagulated, washed and dried, yielding 58 kg polymer.

Two other elastomeric polymers were prepared using a similar process except that the monomer feed ratios were changed to give the indicated polymers. The composition by NMR, Mooney viscosity and thermal transitions by DSC were measured. Typically the melting point is determined from a second DSC heating rather than the first. The first heating may often show additional peaks that are actually due to extractables, e.g., volatiles, remaining the in the polymer. However, the melting points for Examples 10 through 12 are nearly undetectable during the second heating of the DSC. Therefore, crystallization temperatures from the cooling curves are reported instead. Although crystallization temperatures generally are lower than the melting temperatures, comparisons of crystallization temperatures for these examples are useful in reflecting the melting points.

All of these polymers were then individually compounded with bisphenol AF crosslinking-agent (available from Aldrich Chemical Co.) and the following onium accelerators on a two roll mill:

Phosphonium A, which is the complex

which is tributylmethoxypropylphosphonium chloride prepared from tributylphosphene (available from Cytec), allylchloride, and methanol and then reacting with the sodium salt of bisphenol AF;

Phosphonium B, which is a complex prepared by reacting tributylmethoxypropylphosphonium chloride with the sodium salt of perfluorooctyl-n-methylsulfonamide.

The following other compounding ingredients were added: 20 phr carbon black (N990 MT available from R. T. Vanderbilt), 3 phr magnesium oxide (Elastomag 170 from Morton International), and 6 phr calcium hydroxide. The compositions were then tested for various properties according to the test protocols set forth above. The polymer compositions and test results are reported in Tables 13 and 14.

TABLE 13

| Example | 10 | 11 |
| --- | --- | --- |
| VDF (Wgt %) | 26.2 | 22.3 |
| HFP (Wgt %) | 30.1 | 27.3 |

TABLE 13-continued

| Example | 10 | 11 |
|---|---|---|
| TFE (Wgt %) | 43.0 | 44.5 |
| PPVE 1 (Wgt %) | — | 5.2 |
| PPVE 2 (Wgt %) | 0.7 | 0.8 |
| Weight % F | 71.6 | 72.1 |
| Mooney Viscosity (ML1 + 10 @ 121° C.) | 25 | 20 |
| $T_{recrystallization}$ (° C.) Compound | 81 | 93 |
| Bisphenol AF (mmphr)[1] | 6.10 | 6.10 |
| Phosphonium A (mmphr) | 0.78 | 0.78 |
| Phosphonium B (mmphr) | 1.96 | 1.96 |
| Carbon Black (phr)[2] (N 990) | 20 | 20 |
| MgO (phr) | 3 | 3 |
| Ca(OH)$_2$(phr) | 6 | 6 |
| Cure Response | | |
| $M_L$ | 0.2 | 0.1 |
| $M_H$ | 16.4 | 7.1 |
| $t_s2$ (min) | 1.9 | 1.2 |
| t'50 (min) | 2.2 | 1.5 |
| t'90 (min) | 3.3 | 5.2 |
| Physical Properties | | |
| Durometer (Shore A) | 82 | 86 |
| $T_B$ (MPa) | 11.9 | 11.4 |
| $E_B$ (%) | 235 | 264 |
| Flexural Mod. (MPa) | 50 | 51 |
| Vapor Transmission Rate (g-mm/m$^2$day) | 20 | 15 |

1. Millimoles per hundred parts elastomer.
2. Parts per hundred parts elastomer

The higher crystallization temperature, higher TFE content, and lower HFP content would lead one to expect Example 11 to be stiffer than Example 10. However, the flexural moduli indicate that the material stiffness of Examples 10 and 11 are comparable. Example 11 also has a greatly improved vapor transmission rate over Example 10 and cures well despite containing 6 wt % vinyl ether.

TABLE 14

| Example | 12 | C-6 |
|---|---|---|
| VDF (Wgt %) | 21.6 | 26.3 |
| HFP (Wgt %) | 40.5 | 34.7 |
| TFE (Wgt %) | 36.5 | 39.0 |
| PPVE 2 (Wgt %) | 1.2 | — |
| Weight % F | 72.2 | 71.6 |
| Mooney Viscosity (ML1 + 10 @ 121° C.) | 7 | 40 |
| $T_{recrystallization}$ (° C.) Compound | 82 | 67 |
| Bisphenol AF (mmphr)[1] | 6.10 | 6.10 |
| Phosphonium A (mmphr) | 0.78 | 0.78 |
| Phosphonium B (mmphr) | 1.96 | 1.96 |
| Carbon Black (phr)[2] (N 990) | 20 | 20 |
| MgO (phr) | 3 | 3 |
| Ca(OH)$_2$(phr) | 6 | 6 |
| Cure Response | | |
| $M_L$ | 0.2 | 0.2 |
| $M_H$ | 9.3 | 9.9 |
| $t_s2$ (min) | 1.2 | 1.5 |
| t'50 (min) | 1.6 | 1.6 |
| t'90 (min) | 4.1 | 2.3 |
| Physical Properties | | |
| Durometer (Shore A) | 81 | 82 |
| $T_B$ (MPa) | 10.3 | 10.8 |
| $E_B$ (%) | 246 | 277 |
| Flexural Mod. (MPa) | 28 | 24 |
| Vapor Transmission Rate (g-mm/m$^2$day) | 11 | 19 |

Based on the higher crystallization temperature of Example 12 compared to terpolymer C-6, one would expect Example 12 to be stiffer. However, the flexural moduli of Example 12 and C-6 are comparable. Example 12 has a greatly improved vapor transmission rate as well, compared to C-6.

The examples clearly demonstrate that modifying the elastomers with vinylethers provides flexible polymers and compositions having good permeation properties. It also shows that the vinyl ether modification does not affect the cure properties, even at high modification levels, e.g., Example 11, where the cure response is still very acceptable.

We claim:

1. A multilayer article comprising
    a first layer comprising a polymer containing interpolymerized units derived from at least 30 weight percent (wt %) tetrafluoroethylene, (ii) from about 5 to less than 30 wt % vinylidene fluoride, (iii) from 0.5 to 50 wt % of at least one ethylenically unsaturated monomer of the formula $CF_2=CFR_f$ where $R_f$ is a perfluoroalkyl of 1 to 8 carbon atoms, and (iv) a perfluorovinyl ether of the formula $CF_2=CF-(OCF_2CF(R_f))_aOR'_f$ where $R_f$ is as described in (iii), $R'_f$ is a perfluoroaliphatic of 1 to 8 carbon atoms and a has a value of 0 to 3, and
    a second layer.

2. The multilayer article of claim 1 wherein $R'_f$ is a perfluoroalkyl or a perfluoroalkoxy.

3. The multilayer article of claim 1 wherein the fluoropolymer of the first layer is selected from semicrystalline fluoropolymer and an elastomeric fluoropolymer.

4. The multilayer article of claim 1 wherein a is a value of from 1 to 3.

5. The multilayer article of claim 1 wherein the second layer is selected from polyamides, polyimides, polyurethanes, polyolefins, polystyrenes, polyesters, polycarbonates, polyketones, polyureas, polyacrylates, polymethacrylates, epichlorohydrin elastomers, nitrile-butadiene elastomers, acrylonitrile butadiene (NBR) elastomers, butadiene rubber, chlorinated polyethylene, chloro-sulfonated polyethylene, chloroprene, ethylene propylene diene elastomers (EPDM), EPM, isobutylene isoprene, isoprene, polysulfide, styrene butadiene, vinyl acetate ethylene, PVC-NBR, silicone elastomers, and fluoroelastomers.

6. The multilayer article of claim 1 further comprising a tie layer.

7. A shaped multilayer article according to claim 1.

8. An article according to claim 7 having resistance to hydrocarbon fluids.

9. A multilayer article according to claim 1 further comprising a polymer optical fiber.

10. An electrostatically dissipative article according to claim 1.

11. The multilayer article of claim 1 wherein the amount of TFE in the first layer is from 30 to 46 wt %.

12. The multilayer article of claim 11 wherein the amount of monomer of the formula $CF_2=CFR_f$ in the first layer is from 0.5 to 15 wt %.

13. The multilayer article of claim 11 wherein the amount of monomer of the formula $CF_2=CFR_f$ in the first layer is from greater than 14 to 50 wt %.

14. The multilayer article of claim 1 wherein the amount of TFE in the first layer is from 40 to 85 wt %.

15. The multilayer article of claim 14 wherein the amount of monomer of the formula $CF_2=CFR_f$ in the first layer is from 0.5 to 15 wt %.

16. The multilayer article of claim 14 wherein the amount of monomer of the formula $CF_2=CFR_f$ in the first layer is from greater than 14 to 50 wt %.

17. A multilayer article comprising a first layer comprising a polymer containing interpolymerized units derived from (i) from about 40 to 85 weight percent (wt %) tetrafluoroethylene, (ii) from about 5 to less than 30 wt % vinylidene fluoride, (iii) from 0.5 to 50 wt % of at least one ethylenically unsaturated monomer of the formula $CF_2=CFR_f$ where $R_f$ is a perfluoroalkyl of 1 to 8 carbon atoms, and (iv) from 0.1 to 15 wt % of a perfluorovinyl ether of the formula $CF_2=CF-(OCF_2CF(R_f))_aOR'_f$ where $R_f$ is as described in (iii), $R'_f$ is a per fluoroaliphatic of 1 to 8 carbon atoms, and a has a value of 0 to 3, and a second layer.

18. The multilayer article of claim 17 wherein the amount of monomer of the formula $CF_2=CFR_f$ in the first layer is from 0.5 to 15 wt %.

19. The multilayer article of claim 17 wherein the amount of monomer of the formula $CF_2=CFR_f$ in the first layer is from greater than 14 to 50 wt %.

20. The multilayer article of claim 17 wherein the fluoropolymer has a multimodal molecular weight distribution.

21. A curable composition comprising an elastomeric fluoropolymer comprising interpolymerized units derived from (i) 20 to 50 weight percent (wt %) tetrafluoroethylene, (ii) from 10 to 35 wt % of vinylidene fluoride, (iii) from 20 to 50 wt % of a monomer having the formula $CF_2=CFR_f$ wherein $R_f$ is a $C_1$–$C_8$ perfluoroalkyl, and (iv) from 0.1 to 15 wt % of a perfluorovinyl ether of the formula $CF_2=CF-(OCF_2CF(R_f))_aOR'_f$ wherein $R_f$ is as described in (iii), $R'_f$ is a fluoroaliphatic of from 1 to 8 carbon atoms and has a value of from 1 to 8, and a has a value of from 1 to 3 and a curative for the elastomeric fluoropolymer.

22. A curable composition according to claim 21 further comprising one or more filler(s).

* * * * *

UNITED STATES PATENT AND TRADEMARK OFFICE
CERTIFICATE OF CORRECTION

PATENT NO. : 6,610,807 B2  
DATED : August 26, 2003  
INVENTOR(S) : Duchesne, Denis D.

Page 1 of 1

It is certified that error appears in the above-identified patent and that said Letters Patent is hereby corrected as shown below:

<u>Title page,</u>  
Item [57], ABSTRACT,  
Line 7, "$CF_2=CF-(OCF_2CF(R_f))_aOR_f$" should be -- $CF_2=CF-(OCF_2CF(R_f))_aOR'_f$ --  
Line 8, "$R_f$" should be shown as -- $R'_f$ --

<u>Column 3,</u>  
Line 6, delete ")" after "may"  
Line 61, "$(R_f))_aOR'_f$." should be shown as -- $(R_f))_aOR'_f$. --

<u>Column 8,</u>  
Line 5, "$DSC_{7.0}$" should be shown as -- DSC 7.0 --

<u>Column 16,</u>  
Line 25, after "from" insert -- (i) --  
Line 29, "perfiucroalkyl" should be shown as -- perfluoroalkyl --

<u>Column 17,</u>  
Line 21, "$CF_2=CF-(OCF_2CF(R_f)_aOR'_f$" should be -- $CF_2=CF-(OCF_2CF(R_f))_aOR'_f$ --

Signed and Sealed this

Ninth Day of March, 2004

JON W. DUDAS  
*Acting Director of the United States Patent and Trademark Office*